(No Model.)  2 Sheets—Sheet 2.
A. STEIGER.
APPARATUS FOR SEPARATING AND PURIFYING MIDDLINGS.
No. 471,318.  Patented Mar. 22, 1892.
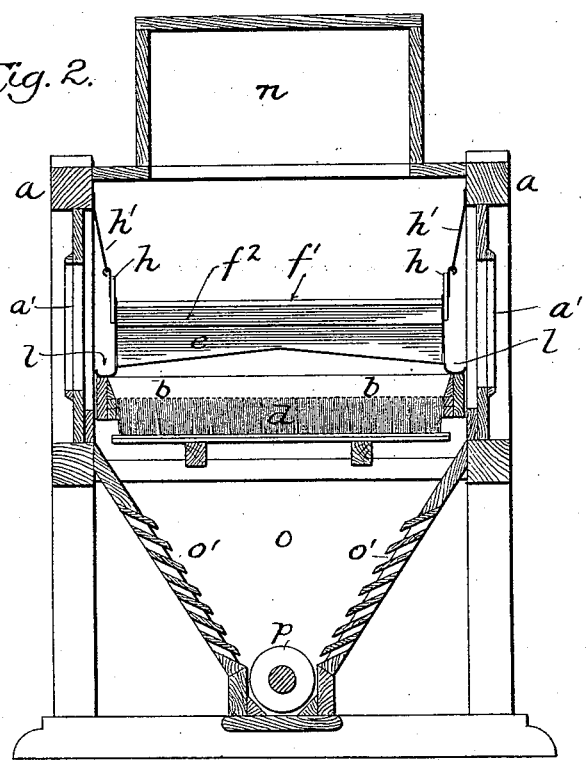
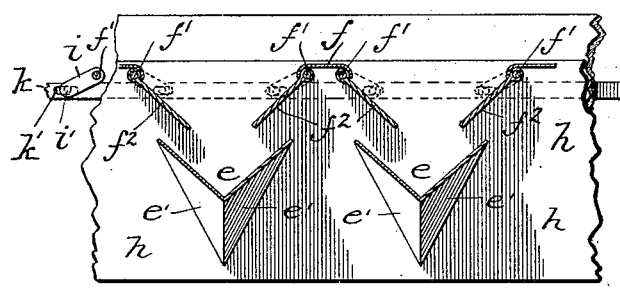
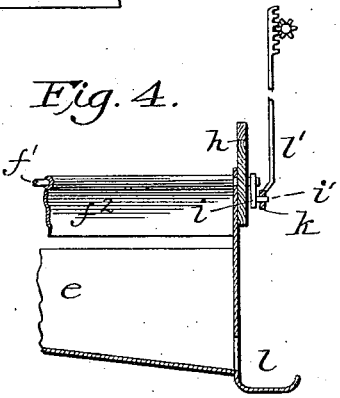
Witness:
James F. Duhamel
Horace A. Dodge
A. STEIGER,
Inventor,
by Dodge Sons,
Attys.

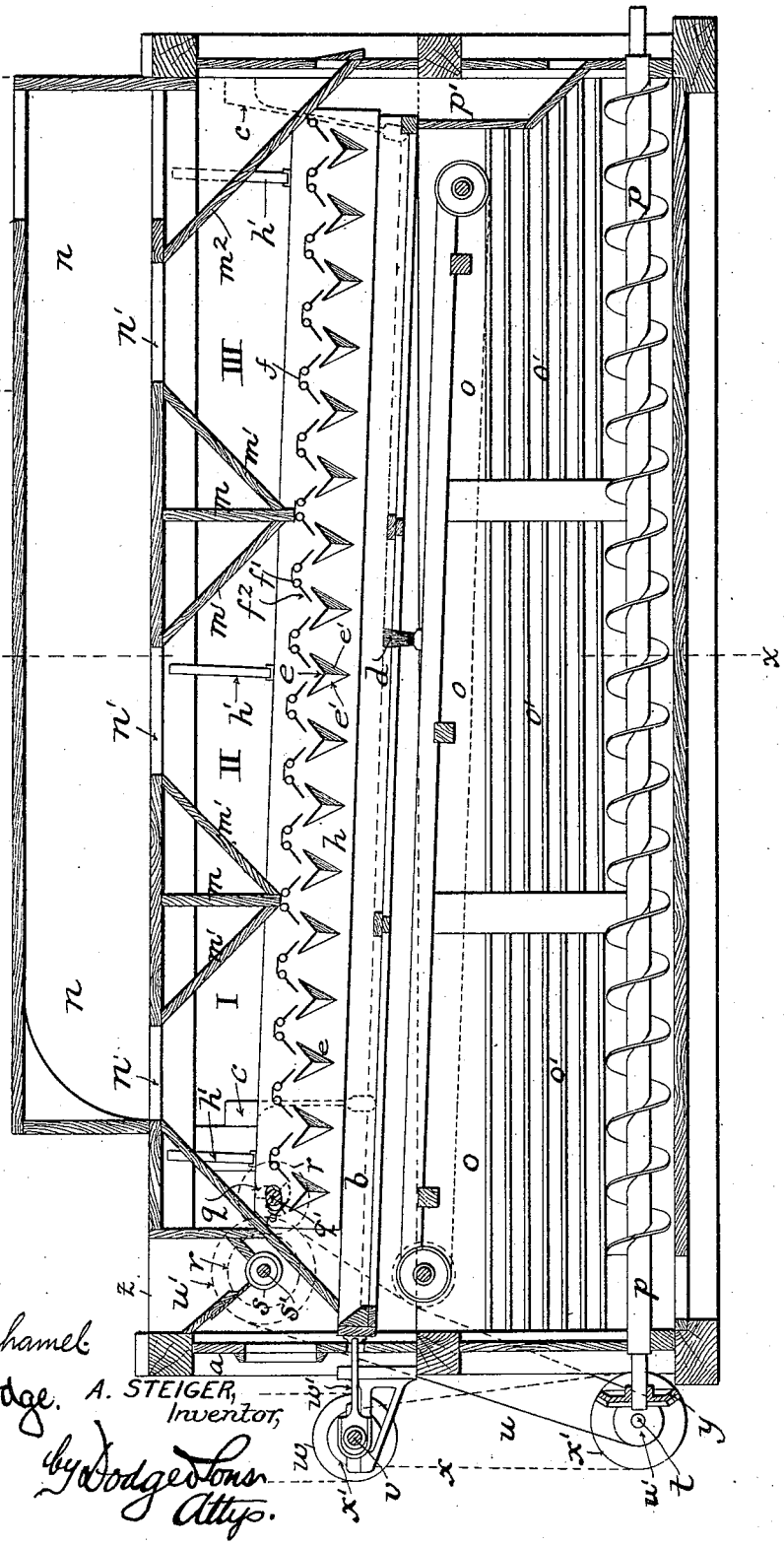

UNITED STATES PATENT OFFICE.

ALPHONS STEIGER, OF LONDON, ENGLAND, ASSIGNOR TO THE EDWARD P. ALLIS COMPANY, OF MILWAUKEE, WISCONSIN.

APPARATUS FOR SEPARATING AND PURIFYING MIDDLINGS.

SPECIFICATION forming part of Letters Patent No. 471,318, dated March 22, 1892.

Application filed December 29, 1891. Serial No. 416,435. (No model.) Patented in England November 13, 1885, No. 13,852; in Germany September 4, 1886, No. 39,841, and in France January 4, 1887, No. 178,339.

*To all whom it may concern:*

Be it known that I, ALPHONS STEIGER, a citizen of the Republic of Switzerland, residing at London, in the county of Middlesex, England, have invented certain new and useful Improvements in Apparatus for Separating and Purifying Middlings, (for which I have received Letters Patent in the United Kingdom, No. 13,852, dated November 13, 1885; in Germany, No. 39,841, dated September 4, 1886, and in France, No. 178,339, dated January 4, 1887,) of which the following is a specification.

The improvements relate in particular to machines for separating and purifying fine dust and middlings in which the purification and separation of light particles—as, for instance, bran, fluff, &c.—from the good parts of the semolina is performed by means of a vibrating sieve, through which passes a blast of air created by the suction of a fan.

The principal object of my invention is to separate and collect the lighter parts of substances—such as middlings or semolina—separately from the purified or heavy particles, and to collect the better particles from the light middlings which have been sucked up from the vibrating sieve by the blast of air passing vertically through the said sieve, the better particles forming a second quality of middlings, while the first quality or the heaviest of the purest middlings can fall through the meshes of the sieve, as well as to provide means for regulating the amount of blast required, according to the size and specific weight of the middlings in the different compartments; and in order that this invention may be better understood I have caused to be appended hereunto two sheets of drawings, marked with letters of reference indicating like parts in the various figures.

Figure 1 is a vertical longitudinal section; Fig. 2, a vertical cross-section at $x\,x$; and Figs. 3 and 4 an enlarged vertical longitudinal and cross-section of a portion of the transverse troughs and valve arrangement, respectively, of my improved middlings separating and purifying machine.

In carrying out my invention I employ within a suitable box or case $a$ and above a vibrating sieve $b$, which is slightly inclined to the end of the box or case $a$ and suspended from the latter by means of iron or wooden springs $c$ and under which vibrating sieve $b$ a traveling brush $d$ is employed to keep the meshes clean, a suitable number of transverse troughs $e$, made of light material—such as wood or sheet-tin—triangular or elliptical in section. These transverse troughs $e$ are arranged at a certain distance apart from each other and along the whole surface of the vibrating sieve $b$ in such a manner that there will be sufficient space for the offal or bran-laden air to be drawn between them, and a uniform pressure of air underneath the vibrating sieve $b$ is insured.

At a certain height above and over the open space between these transverse troughs I employ a corresponding number of roof-shaped boardings $f$, the sides of which being hinged or provided with pivots at $f'$ form adjustable valves $f^2$ and overlap the sides $e'$ of the transverse troughs $e$, respectively, so as to permit the offal or bran laden air to enter the transverse troughs $e$ and deposit the heavier particles in the same, while the fluff which remains in the air passes on and is drawn away by the suction of the fan $g$. The blast of air passing through the vibrating sieve $b$ is thus caused to deviate from its vertical course and forced to pass underneath the valves $f^2$ and into the transverse troughs $e$, the entrance of the air being so regulated as to be less in section than the exit of the air, thus leaving the heavier or better particles which have been taken up from the vibrating sieve $b$ in the transverse troughs $e$.

On one side of the machine the pivots at $f'$ on the valves $f^2$ are made to pass through the frame $h$ to receive crank-levers $i$, provided with pins $i'$. The said crank-levers $i$ are connected to longitudinal rods $k$ by passing the pins $i'$ through a corresponding number of slots $k'$, formed in the rods $k$, which run parallel with the frame $h$, and when raised or lowered cause the valves $f^2$ either to close or open and increase or decrease accordingly the suction between them and the transverse troughs $e$. The longitudinal rods $k$ are suitably connected to vertical rods $l'$, sliding in brackets fixed to the box or case $a$ of the machine and having a vertical movement imparted thereto by means of a small rack and pinion, handle and lever, or in any other suitable manner which permits of an accurate and ready adjustment and retaining of the valves $f^2$ in the required position. The transverse troughs $e$ and valves $f^2$ are connected to the frame $h$, which is suspended in an inclined position following that of the vibrating sieve $b$ by means of straps $h'$, fixed to the box or case $a$. The frame $h$ is also made to vibrate, but independently of and less than the vibrating sieve $b$, its function being only to bring the heavier particles which have dropped into the channels $l$ to the end of the lower part of the frame $h$ into suitable hoppers formed on the side of the machine. The bottoms of the transverse troughs $e$ are formed inclined from their middle toward each side of the machine so as to permit the heavier particles deposited therein to fall into the slightly-inclined channels $l$, running on each side along the ends of the transverse troughs $e$, from where they are delivered separately, as desired.

The blast of air produced by the fan $g$ passing between the transverse trough $e$ and underneath the roof-shaped boardings $f$ can be regulated in such a manner as to obtain an equal and independent pressure on each surface of the vibrating sieve $b$ for the different grades of middlings, the valves $f^2$ belonging to one grade of middlings being connected together, and by means of a handle simultaneously and equally adjusted, thus giving an equal section of blast for each set of transverse troughs $e$. The frame of the vibrating sieve $b$ is so arranged as to facilitate an easy fixing and exchanging of the silks used for the different grades, which permits of any desired size of middlings being purified and the blast of air required regulated accordingly. The space above the latter is limited by the top of the box or case $a$, and is divided into different compartments I II III by vertical cross-partitions and inclined boards $m$, $m'$, and $m^2$, which compartments correspond in number with the different grades of the silk of the vibrating sieve $b$. These inclined boards are designed to widen the section of the blast and consequently reduce the suction, which causes a part of the fluff or light particles contained in the air-chamber $n$ to be dropped and collected therein, thereby nearly freeing the air from such light substances when it reaches the exhaust-fan $g$. These compartments are formed with openings $n'$ at the top, which are in communication with the air-chamber $n$ and the exhaust-fan $g$, and which openings, if found necessary, may also be provided with valves for regulating the blast of air. The said box or case $a$, at its bottom, is formed into a hopper $o$, in which is employed a collecting worm $p$, which collects the first quality of the purified middlings which have passed through the meshes of the silk of the vibrating sieve $b$, the trailings falling from the vibrating sieve $b$ into and through a spout $p'$, formed at the end of the box or case $a$ out of the machine. The sides of the box or case $a$ near the channels along the transverse troughs are provided with windows $a'$ for permitting inspection of the working and giving access to the inner parts of the machine in case of repairs.

The vibration of the frame $h$ is effected by means of cam-wheels $q$, against which the frame $h$ is made to bear. These cam-wheels $q$ are fixed on a cross-shaft $q'$, which by means of the spur-wheels $r$ is geared up with the feed-roller $s$, which latter distributes the middlings equally over the vibrating sieve $b$.

The feed-roller shaft $s'$ receives rotary motion from another cross-shaft $t$ by means of a chain $u$, and pulleys $u'$, fixed on the respective shafts, which chain also actuates the traveling brush $d$. Instead of driving the cross-shaft from the feed-roller shaft $s'$, rotary motion may be transmitted from the cross-shaft $t$ to the cross or cam-wheel shaft $q'$ and from the latter to the feed-roller shaft $s'$.

The vibrating sieve $b$ receives its motion from the crank or driving shaft $v$, provided with the driving-pulley $w$ and crank-arms $w'$. Said shaft $v$ also imparts motion to the cross-shaft $t$ by means of the belt $x$ and pulley $x'$, fixed on the shaft $t$, from which latter the collecting-worm $p$ is also driven by means of the bevel-gear $y$.

The following is the manner in which the described machine performs its work: The semolina or substance to be separated is fed into the hopper $z$, and by means of the roller $s$ upon the vibrating sieve $b$ and by the shaking movements of the latter travels slowly from the higher to the lower end thereof, permitting the middlings of a certain size only to pass through the meshes of the silk of the vibrating sieve $b$ and fall through the same, while at the same time a blast of air enters the machine underneath the vibrating sieve $b$ through openings $o'$, formed in the sides of the hopper $o$, which blast of air is caused to pass vertically through the silk of the vibrating sieve $b$ and prevents light materials, which are of inferior quality, to pass through the meshes of the silk of the vibrating sieve $b$ when the size of the same would allow it. These light particles are drawn up from the vibrating sieve $b$ by the blast, and are forced by the valves $f^2$ and the transverse troughs $e$ to deviate from the vertical direction, while at the same time the valves $f^2$ and transverse troughs $e$ cause an equal pressure of the air to be exerted on the vibrating sieve $b$. The valves $f^2$ are so adjusted that the air by its compression and greater speed causes, as aforesaid, the air containing the lighter particles to enter into the transverse troughs $e$, which, on account of the greater section of the outlet, the compression and therefore the speed of the wind is decreased, thus causing the heavier and better part of the lighter particles to remain in the transverse troughs $e$ until on account of their vibration the latter then are removed into the channels $l$. The air then resumes its vertical direction and enters into the air-chamber $n$ at the top of the machine, the inclined boards $m'$ at the inlet making the entrance easier, thus preventing whirlwinds. The section of the air-chamber $n$ increasing again at the lower end of the machine, fluff and other light material which might have been carried into the same is dropped, and the wind reaches the fan $g$ almost pure of such materials.

The construction and arrangement of the frame $h$, with its troughs and valves, is such as to form a series of nozzles or openings directly above the sieve-cloth having an exit-opening of less area than the opening at the base, whereby the dust-laden air-current is given an increased velocity as it is discharged and a decreased velocity after it is discharged from the nozzles or openings.

I declare that what I claim is—

1. In combination with a casing, a sieve $b$, mounted therein, means for producing an air-current upward through the sieve, and a vibrating frame $h$, located above the sieve and carrying a series of troughs $e$, and valves $f^2$, all substantially as shown and described.

2. In combination with a casing, a sieve $b$, mounted therein, means for producing an air-current upward through the sieve, a vibrating frame $h$, located above the sieve, the troughs $e$, carried by the said frame, and the boardings $f$, provided with the adjustable valves $f^2$, the boardings and their valves being located over the space between the troughs, all substantially as shown and described.

3. In combination with a casing, a sieve $b$, mounted therein and provided with bolting material of different degrees of fineness, means for producing an air-current upward through the sieve, a vibrating frame $h$, located above the sieve, a series of separated troughs mounted in the frame, and a series of valved hoods or boardings adjustable with reference to the particular grade of bolting material above which they are located, all substantially as shown and described.

4. In combination with a casing, a sieve mounted therein, means for producing an air-current upward through the sieve, a vibrating frame $h$ above the sieve, the V-shaped troughs carried by the frame, and the boardings $f$, provided with the adjustable valves $f^2$, extending over the edges of the troughs, all substantially as shown and described.

5. In combination with a vibrating sieve, means for producing a current of air upward therethrough, the transverse troughs $e$, sloping from the center, with deflecting-hoods $f$, longitudinal troughs $l$, and means $n$ and $g$ for carrying off the lighter materials and dust, whereby are obtained two grades of good material, the heavier that passing through the sieve and the lighter that caught in the troughs, while the fine and light material is carried off.

6. In combination with a casing divided into compartments I II III, &c., having sloping walls $m'$ $m^2$, an air-trunk $n$, communicating with the several compartments through openings $n'$, a fan $g$, a sieve $b$, mounted in the lower portion of the compartments, and a vibrating frame provided with valved troughs located directly above the sieve, all substantially as shown and described.

7. In combination with a casing, a sieve $b$ mounted therein, means for producing an upward air-current through the sieve, a vibrating frame $h$ above the sieve provided with the valved troughs $e$ and the gutters $l$ at the ends of the troughs, all substantially as shown and described.

8. In combination with a casing, a sieve $b$ mounted therein, means for producing an upward air-current through the sieve, a vibrating frame $h$ above the sieve, and a series of troughs $e$, carried by the frame, said troughs being substantially V-shaped in cross-section and inclining or tapering from the ends toward the middle.

9. In a middlings-purifier, the combination of a casing divided into compartments I II III, a sieve $b$, provided with bolting-cloth of different degrees of fineness, means for producing an upward air-current therethrough, and a vibrating frame located above the sieve and provided with openings larger at the base than at the discharge and communicating with the compartments of the casing, the whole being combined and operating substantially as shown and described.

10. In a middlings-purifier, the combination of a casing, a sieve mounted therein, means for producing an air-current upward through the sieve, and a vibrating frame provided with valved troughs arranged substantially as shown and described to form contracted nozzles or openings, (larger at the base than at the discharge,) whereby the air-current is caused to deposit in said troughs a second grade of material and then allowed to pass off into the casing with the light dust, &c.

11. In a purifier, the combination of a casing, a sieve mounted therein, means for producing an air-current upward through the sieve, a vibrating frame located above the sieve and provided with means substantially such as shown and described for causing the air that passes through the sieve to first pass upward and thence laterally through a contracted opening, and an exhausting-chamber above the frame into which the air escapes, whereby the air passing through the contracted openings will upon expanding deposit upon the upper portion of the frame a second grade of good material, and then escape with the dust into the upper part of the casing.

12. In a purifier, the combination of a casing, a sieve mounted therein and provided with cloth of different degrees of fineness, means for creating an air-current upward through the sieve, and a vibrating frame located above the sieve and provided with means independent of the casing for regulating the currents of air passing through the different sections of the sieve and for causing a deposit of material on the upper face of said frame.

In testimony whereof I have signed my name to this specification in the presence of two subscribing witnesses.

ALPHONS STEIGER.

Witnesses:
W. F. NORWOOD,
HAROLD WADE.